United States Patent [19]
Clements

[11] 4,037,859
[45] July 26, 1977

[54] IRRIGATION PIPE JOINT LOCK

[76] Inventor: Lloyd W. Clements, 49 W. Lincoln Ave., C., Woodland, Calif. 95695

[21] Appl. No.: 706,887

[22] Filed: July 19, 1976

[51] Int. Cl.² .................. F16L 23/00; F16L 37/12
[52] U.S. Cl. ............................. 285/5; 24/254; 285/336; 285/364; 285/DIG. 22
[58] Field of Search ............ 285/365, 364, 366, 407, 285/411, 419, 373, 5, 406, DIG. 22, 233, 336; 24/254, 252 R, 252 PC, 252 CP, 252 A, 252 J, 252 AT, 252 LH, 252 CD, 252 DC, 252 CL, 252 HE, 252 HC, 252 B, 252 BC, 252 SH, 252 GC, 252 DP, 252 TH, 252 T, 252 TC, 20 S, 20 R, 67.5

[56] References Cited
U.S. PATENT DOCUMENTS

| | | | |
|---|---|---|---|
| 1,125,403 | 1/1915 | Schade | 24/252 PC |
| 2,261,005 | 10/1941 | Thompson et al. | 24/252 CP |
| 2,709,094 | 5/1955 | Polanski | 285/407 |
| 2,789,844 | 4/1957 | Kessler | 285/365 X |
| 3,479,069 | 11/1969 | Sedam | 285/364 |
| 3,930,674 | 1/1976 | Jonsson | 285/365X |

FOREIGN PATENT DOCUMENTS 288,980  11/1915  Germany .................. 24/67.5

Primary Examiner—Thomas F. Callaghan
Attorney, Agent, or Firm—Klarquist, Sparkman, Campbell, Leigh, Hall & Whinston

[57] ABSTRACT

A U-lock has a pair of hinged channel-like arms with flared free ends and a U-shaped spring strap handle connected to the arms and adapted to push them onto and hold them in clamping positions on flanges of irrigation pipe sections.

7 Claims, 3 Drawing Figures

IRRIGATION PIPE JOINT LOCK

DESCRIPTION

This invention relates to an irrigation pipe joint lock, and has for an object thereof the provision of an improved irrigation pipe joint lock.

Another object of the invention is to provide an irrigation pipe joint lock which is easily installed and removed.

A further object of the invention is to provide a very simple, very reliable irrigation pipe joint lock.

A further object of the invention is to provide an irrigation pipe joint lock having a pair of hinged, channel-like arms having flared outer ends and a spring strap handle connected to its ends to intermediate portions of the arms.

Figure 1:
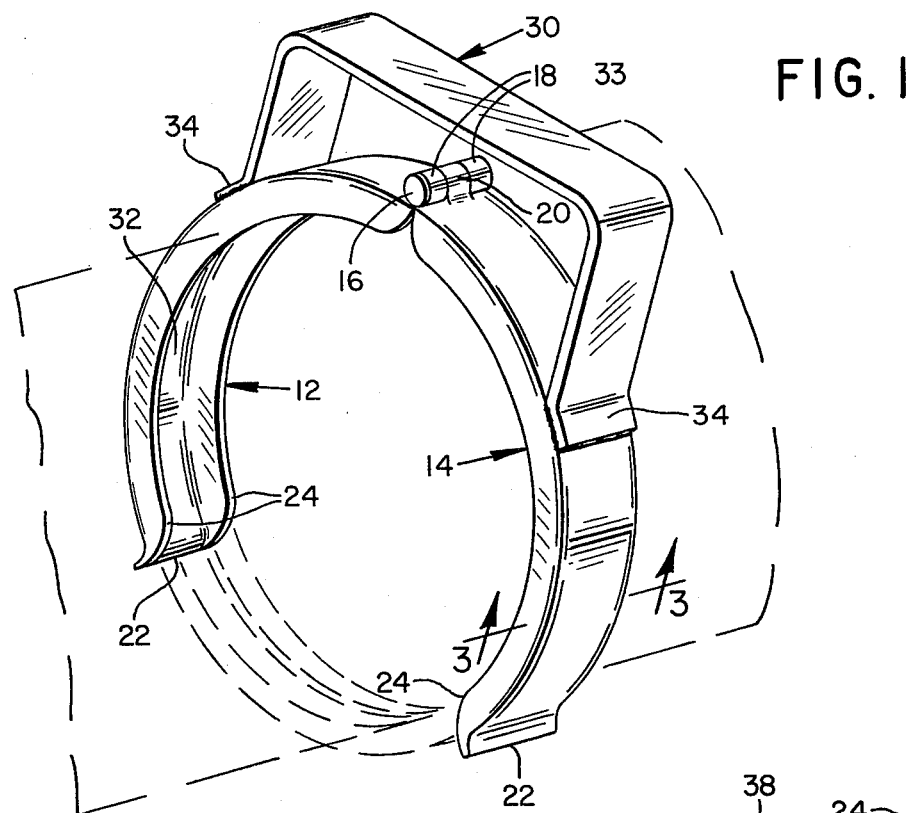
FIG. 1 is a perspective view of an irrigation pipe joint lock forming one embodiment of the invention.
Figure 3:
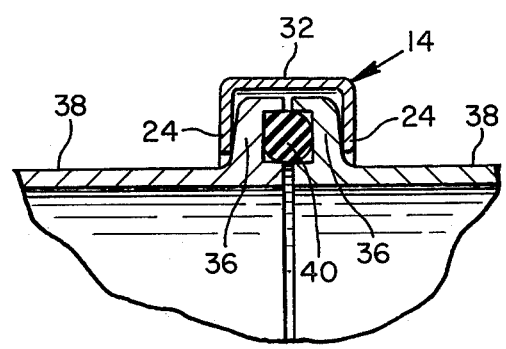
FIG. 3 is an enlarged longitudinal sectional view taken along line 3—3 of FIG. 1.

An irrigation pipe joint lock 10 forming a specific embodiment of the invention includes a pair of channel-like arcuate arms 12 and 14 each subtending an angle of about 135° and hinged together by a pintle 16. The arm 12 has two sleeve-like end portions 18 and the arm 14 having one sleeve-like end portion 20 fitting in between the portions 18, the arms 12 and 14 being otherwise identical. The arms have outwardly flared free end, camming portions 22 with flanges 24 tapering. Inner end portions 26 of the flanges 24 are rounded to permit the arms to be moved together to normal positions thereof shown in full lines in FIG. 2.

Figure 2:
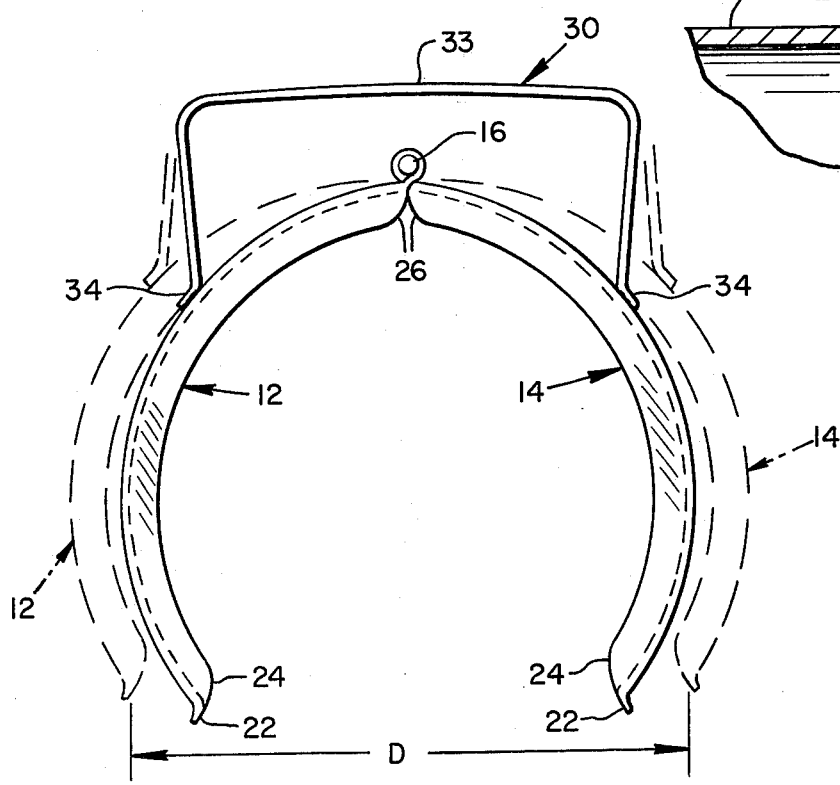
FIG. 2 is an elevation view of the lock of FIG. 1.

A spring strap handle 30 of substantially the same width as that of bases 32 of the arms 12 and 14, has a U-shaped body 33 and feet 34 welded to the bases 32 equidistantly from the pindle 16. The handle strongly biases the arms toward their normal positions, further inward movement being prevented by abutment of the inner ends of the base portions. The handle permits the arms to be swung apart to open positions as they are pushed past center on flanges 36 of irrigation pipe sections 38 to seat on the flanges and compress the flanges against gasket 40. The arms as shown in broken lines in FIG. 2 are in their open positions with the camming portions 22 spaced apart a distance "D" equal to the outside diameter of the flanges 36, the camming portions riding on the outer peripheries of the flanges as the lock is pushed onto the flanges.

What is claimed is:

1. In an irrigation pipe joint clamp,
    a pair or arcuate channel-like arms having first camming end portions,
    securing means pivotally securing second hinging ends together,
    and a generally U-shaped spring handle secured to the arms and biasing them inwardly,
    the handle having a base portion spaced from the arms and the securing means sufficiently for the fingers of a user to be inserted therebetween.

2. The clamp of claim 1 wherein the securing means includes a pintle.

3. The clamp of claim 2 wherein the camming end portions are outwardly flared portions of the bottoms of the channel-like arms.

4. The clamp of claim 1 wherein the camming end portions are outwardly flared portions of the bottoms of the channel-like arms.

5. The clamp of claim 4 wherein the handle is of strap material.

6. The clamp of claim 5 wherein the handle has a pair of feet secured to the arms.

7. The clamp of claim 5 wherein the handle has a pair of feet welded to the arms.

* * * * *